United States Patent
Park et al.

(10) Patent No.: US 12,503,531 B2
(45) Date of Patent: Dec. 23, 2025

(54) ORGANIC AND INORGANIC COMPOSITE POLYMER ELECTROLYTE AND ALL SOLID STATE BATTERY COMPRISING THE SAME

(71) Applicants: SK On Co., Ltd., Seoul (KR); SK Innovation Co., Ltd., Seoul (KR)

(72) Inventors: Myung Soo Park, Daejeon (KR); Seung Hwan Lee, Daejeon (KR); Han Sol Lee, Daejeon (KR); Hyeon Jin Go, Daejeon (KR); Myoung Lae Kim, Daejeon (KR); Hong Won Lee, Daejeon (KR)

(73) Assignees: SK On Co., Ltd., Seoul (KR); SK Innovation Co., Ltd., Seoul (KR)

( * ) Notice: Subject to any disclaimer, the term of this patent is extended or adjusted under 35 U.S.C. 154(b) by 0 days.

(21) Appl. No.: 18/741,975

(22) Filed: Jun. 13, 2024

(65) Prior Publication Data
US 2024/0425626 A1 Dec. 26, 2024

(30) Foreign Application Priority Data

Jun. 15, 2023 (KR) .................. 10-2023-0076836
Jun. 12, 2024 (KR) .................. 10-2024-0076304

(51) Int. Cl.
*H01M 50/583* (2021.01)
*C08F 130/02* (2006.01)
(Continued)

(52) U.S. Cl.
CPC .............. *C08F 130/02* (2013.01); *C08K 3/16* (2013.01); *C08K 3/26* (2013.01); *H01M 10/056* (2013.01);
(Continued)

(58) Field of Classification Search
None
See application file for complete search history.

(56) References Cited

U.S. PATENT DOCUMENTS

2013/0337337 A1\* 12/2013 Lee ................. H01M 10/052
429/317
2016/0164138 A1\* 6/2016 Han ................. H01M 10/056
427/126.3
(Continued)

FOREIGN PATENT DOCUMENTS

CN 107863555 A 3/2018
CN 111293287 \* 6/2020
(Continued)

OTHER PUBLICATIONS

Jones et al., "Solubilization of SEI lithium salts in alkylcarbonate solvents", Fluid Phase Equilibria, 2011, pp. 121-126, vol. 305.
(Continued)

*Primary Examiner* — Lisa S Park
(74) *Attorney, Agent, or Firm* — The Webb Law Firm (57) ABSTRACT

Provided is an organic and inorganic composite polymer electrolyte and an all-solid-state battery including the same, and provided is an organic and inorganic composite polymer electrolyte including a flame-retardant polymer and a flame-retardant inorganic salt with a shear modulus of 7 to 60 GPa, and an all-solid-state battery including the organic and inorganic composite polymer electrolyte.

19 Claims, 2 Drawing Sheets

(51) Int. Cl.
*C08K 3/16* (2006.01)
*C08K 3/26* (2006.01)
*H01M 10/052* (2010.01)
*H01M 10/056* (2010.01)
*H01M 10/42* (2006.01)
*H01M 50/383* (2021.01)

(52) U.S. Cl.
CPC ..... *H01M 10/4235* (2013.01); *H01M 50/383* (2021.01); *C08K 2003/262* (2013.01); *C08K 2201/005* (2013.01); *H01M 2300/0082* (2013.01); *H01M 2300/0091* (2013.01)

(56) References Cited

U.S. PATENT DOCUMENTS

| 2020/0321617 | A1* | 10/2020 | Xiao | H01M 10/052 |
| 2020/0411905 | A1* | 12/2020 | Yang | H01M 10/0568 |
| 2022/0013807 | A1 | 1/2022 | Li et al. | |
| 2022/0238916 | A1 | 7/2022 | Jang | |
| 2022/0407182 | A1* | 12/2022 | Jang | H01M 4/62 |
| 2024/0097192 | A1 | 3/2024 | Ding et al. | |

FOREIGN PATENT DOCUMENTS

| CN | 113234195 | * | 8/2021 |
| JP | 2007280948 A | | 10/2007 |

OTHER PUBLICATIONS

Lu et al., "Conformational isomerism breaks the electrolyte solubility limit and stabilizes 4.9 V Ni-rich layered cathodes", Nature Communications, 2024, pp. 1-11, vol. 15, No. 9108.

Neuhaus et al., "Physico-chemical properties of solutions of lithium bis(fluorosulfonyl)imide (LiFSI) in dimethyl carbonate, ethylene carbonate, and propylene carbonate", Journal of Power Sources, 2018, pp. 148-159, vol. 394.

Xin et al., "Solubilities of six lithium salts in five non-aqueous solvents and in a few of their binary mixtures", Fluid Phase Equilibria, pp. 1-7, vol. 461.

* cited by examiner

FIG. 2

ORGANIC AND INORGANIC COMPOSITE POLYMER ELECTROLYTE AND ALL SOLID STATE BATTERY COMPRISING THE SAME

CROSS-REFERENCE TO RELATED APPLICATIONS

This application claims priority to Korean Patent Application No. 10-2023-0076836 filed Jun. 15, 2023, and Korean Patent Application No. 10-2024-0076304 filed Jun. 12, 2024, the disclosures of which are hereby incorporated by reference in their entireties.

BACKGROUND

Technical Field

The disclosure and implementations disclosed in this patent document generally relate to an organic and inorganic composite polymer electrolyte and an all-solid-state battery including the organic and inorganic composite polymer electrolyte.

TECHNICAL DESCRIPTION

Lithium secondary batteries may generally be manufactured using a positive electrode and a negative electrode, containing an electrode active material capable of inserting/releasing lithium ions, and an electrolyte, which may be a transfer medium for the lithium ions. As the electrolyte, a liquid electrolyte, especially an ion-conducting organic liquid electrolyte in which a salt is dissolved in a non-aqueous electrolyte solvent, has mainly been used.

However, such a liquid electrolyte may cause electrolyte leakage, and high flammability of the non-aqueous electrolyte solvent may cause safety problems of a device such as ignition, explosion, or the like.

Accordingly, a secondary battery using a polymer electrolyte without fear of leakage has been proposed. The polymer electrolyte may be generally manufactured by impregnating a polymer matrix formed by polymerizing a polymerizable monomer and a polymerization initiator, with an electrolyte solution containing an electrolyte salt and an organic solvent.

Secondary batteries containing such a polymer electrolyte may provide an effect of improving battery safety, but there may be a limitation in that they cannot be completely free from the problem of ignition because the polymer electrolyte still contains a non-aqueous electrolyte solvent.

Meanwhile, polymer electrolytes generally do not contain a polymer having flame retardancy, and electrolytes generally do not contain a functional inorganic salt.

Many technologies regarding an organic and inorganic polymer electrolyte partially containing an inorganic material and a polymer have been reported, but the inorganic material included in these technologies is aimed at improving mechanical properties of the polymer electrolyte and is not aimed at securing flame retardancy of the electrolyte.

SUMMARY

The present disclosure may be implemented in some non-limiting embodiments to provide an organic and inorganic composite polymer electrolyte improving safety and lifespan characteristics of a lithium secondary battery.

Specifically, as a non-limiting embodiment, the disclosure is to provide an organic and inorganic composite polymer electrolyte improving flame retardancy of the electrolyte, strengthening mechanical properties of the electrolyte, preventing short circuits in a battery, and suppressing growth of a lithium dendrite.

In some non-limiting embodiments of the disclosure, an organic and inorganic composite polymer electrolyte is provided, and the organic and inorganic composite polymer electrolyte includes a flame-retardant polymer and a flame-retardant inorganic salt with a shear modulus of 7 to 60 GPa.

The flame-retardant polymer may include at least one selected from the group consisting of a phosphorus-based polymer, a phosphazene-based polymer, a fluorinated polymer, and an ionic polymer.

The phosphorus-based polymer may include at least one selected from the group consisting of phosphate, phosphonate, and phosphinate.

The phosphorus-based polymer may include a structural unit derived from a compound represented by Formula 1:

[Formula 1]

In Formula 1, $L^1$ to $L^3$ may each independently be a direct bond; or substituted or unsubstituted $C_1$~$C_{20}$ alkyl, and $R^1$ to $R^3$ may be independent of each other, at least one thereof may be a functional group having a double bond between carbons, and the others thereof may each independently be a hydrogen or a substituted or unsubstituted hydrocarbyl group.

In Formula 1, $R^1$ to $R^3$ may be independent of each other, and at least one thereof may be a functional group selected from an acrylate group, a methacrylate group, a cyanoacrylate group, a vinyl acrylate group, a vinyl group, an allyl group, and a vinyl ether group.

The hydrocarbyl group may be selected from substituted or unsubstituted $C_1$~$C_{20}$ alkyl, substituted or unsubstituted $C_2$~$C_{20}$ alkenyl, and substituted or unsubstituted $C_6$~$C_{20}$ aryl.

The phosphazene-based polymer may include at least one selected from the group consisting of linear phosphazene and cyclic phosphazene.

The flame-retardant polymer may further include a structural unit derived from a network-type polymer structure-derived compound having two or more reactive functional groups.

The network-type polymer structure-derived compound may include a compound represented by the following Formula 2:

[Formula 2]

In Formula 2, $R^4$ to $R^6$ may each independently be selected from the group consisting of hydrogen, an acrylate group, a methacrylate group, a cyanoacrylate group, a vinyl acrylate group, a vinyl group, an allyl group, and a vinyl ether group, and at least two of $R^4$ to $R^6$ may be selected from the group consisting of an acrylate group, a methacrylate group, a cyanoacrylate group, a vinyl acrylate group, a vinyl group, an allyl group, and a vinyl ether group, and $R^7$ may be selected from hydrogen, substituted or unsubstituted $C_1$~$C_{20}$ alkyl, substituted or unsubstituted $C_2$~$C_{20}$ alkenyl, and substituted or unsubstituted $C_6$~$C_{20}$ aryl.

The flame-retardant polymer may be included in an amount of 50% by weight or less of a total weight of the organic and inorganic composite polymer electrolyte.

The flame-retardant inorganic salt may generate an F radical or $CO_2$ by thermal decomposition.

The flame-retardant inorganic salt may have a solubility in water of 1.5 g/100 mL or less.

The flame-retardant inorganic salt may have a particle size of 5 nm to 50 μm.

The flame-retardant inorganic salt may be selected from the group consisting of a fluoride of metal, and a carbonate compound of metal.

The flame-retardant inorganic salt may include a fluoride of Li or Na or a carbonate of Li or Na.

The flame-retardant inorganic salt may be 10% by weight or less of a total weight of the organic and inorganic composite polymer electrolyte.

In some non-limiting embodiments of the disclosure, an all-solid-state battery is provided, and the all-solid-state battery includes a negative electrode, a positive electrode, and the organic and inorganic composite polymer electrolyte, described above, between the negative electrode and the positive electrode.

The organic and inorganic composite polymer electrolyte may have a concentration gradient of the flame-retardant inorganic salt.

An amount of the flame-retardant inorganic salt in a surface portion may be greater than an amount of the flame-retardant inorganic salt in a central portion, in a thickness direction of the organic and inorganic composite polymer electrolyte based on weight.

BRIEF DESCRIPTION OF THE DRAWINGS

Certain aspects, features, and advantages of the disclosure may be illustrated by the following detailed description with reference to the accompanying drawings.

FIG. 1A and FIG. 1B are photographs taken to illustrate fluidity of organic and inorganic composite polymer electrolytes, prepared in Inventive Examples 1 and 2 and Comparative Examples 2 and 3.

DETAILED DESCRIPTION

Features of the disclosure disclosed in this patent document may be described by example and non-limiting embodiments with reference to the accompanying drawings.

The disclosure may be implemented in some non-limiting embodiments to provide an organic and inorganic composite polymer electrolyte including a flame-retardant polymer and a flame-retardant inorganic salt, wherein the flame-retardant inorganic salt has a shear modulus of 7 to 60 GPa. The electrolyte according to the disclosure may be an organic and inorganic composite polymer electrolyte containing a flame-retardant inorganic salt, an electrolyte salt, and a non-aqueous solvent within a flame-retardant polymer matrix.

In the disclosure, flame retardancy refers to ability to burn when a sample is in contact with a flame (ignition source), but prevent or suppress combustion while emitting a flame on its own when the flame is removed, the flame retardancy may be evaluated by a time period taken for extinguishing when a torch is used to ignite by providing a certain amount of heat to the sample during 1 second or more and the torch is then removed, and the flame retardancy may be evaluated as excellent if the time period taken for extinguishing is short.

Specifically, the flame-retardant polymer may be manufactured as a glass fiber-impregnated film or a self-supporting film with a diameter of 19 mm, and may be a polymer to be extinguished within 2 seconds, specifically within 1 second, and more specifically within 0.5 seconds, when a torch is used to ignite by providing a certain amount of heat to the sample during 1 second or more and the torch is then removed. In addition, the flame-retardant inorganic salt may be an inorganic salt to be extinguished within 2 seconds, specifically within 1 second, and more specifically within 0.5 seconds, when 0.1 g or more of powder is ignited, as described above. The flame-retardant polymer and the flame-retardant inorganic salt may be added to the organic and inorganic composite polymer electrolyte to improve flame retardancy of the electrolyte.

The flame-retardant polymer may be solidified by polymerizing flame-retardant monomers, and may be provided as a polymer matrix. Therefore, the polymer matrix may have low fluidity within the electrolyte, and may not inhibit movement of lithium ions within the electrolyte, even when the electrolyte contains a solvent.

In the disclosure, the flame-retardant polymer may be a polymer having a functional group capable of stopping combustion by capturing radicals. The flame-retardant polymer may be a polymer of monomers having at least one double bond, but the disclosure is not limited thereto, and may include, for example, at least one selected from the group consisting of a phosphorus-based polymer including phosphate, phosphonate, and phosphinate; a phosphazene-based polymer including linear phosphazene and cyclic phosphazene; a fluorinated polymer including a fluorinated ($C_1$~$C_{20}$)alkyl, a fluorinated ether, a fluorinated ester, and a fluorinated carbonate; and an ionic polymer including imidazolium, pyrrolidinium, piperidinium, pyridinium, ammonium, and phosphonium.

Specifically, the flame-retardant polymer may include a structural unit derived from a monomer having at least one double bond, and the monomer having at least one double bond is not particularly limited as long as it is a monomer having a double bond. Specifically, the double bond may be included as a polymerizable group. For example, a functional group having a double bond between carbons at the terminal may be included as a polymerizable group, and, specifically, at least one selected from the group consisting of an acrylate group, a methacrylate group, a cyanoacrylate group, a vinyl acrylate group, a vinyl group, an allyl group, and a vinyl ether group may be included as a polymerizable group.

The monomer having at least one double bond may include 1 to 3 polymerizable groups, and may specifically have 1 or 2 polymerizable groups.

For example, the monomer having at least one double bond may include a phosphorus (P) element, and, for example, may include a phosphorus moiety.

Specifically, the monomer having at least one double bond may be represented by Formula 1, and a phosphorus-based flame-retardant polymer may be produced by polymerization of this monomer.

[Formula 1]

In Formula 1, $L^1$ to $L^3$ may each independently be a direct bond; or substituted or unsubstituted $C_1$~$C_{20}$ alkyl.

In addition, in Formula 1, $R^1$ to $R^3$ may be independent of each other, at least one thereof may be a functional group having a double bond between carbons, and the others thereof may each independently be a hydrogen or a substituted or unsubstituted hydrocarbyl group.

Specifically, in Formula 1, $R^1$ to $R^3$ may be independent of each other, and at least one of $R^1$ to $R^3$ may be a functional group having a double bond between carbons, for example, an acrylate group, a methacrylate group, a cyanoacrylate group, a vinyl acrylate group, a vinyl group, an allyl group, a vinyl ether group, or a combination thereof.

The substituted or unsubstituted hydrocarbyl group is not limited thereto, but may be substituted or unsubstituted $C_1$~$C_{20}$ alkyl, substituted or unsubstituted $C_2$~$C_{20}$ alkenyl, or substituted or unsubstituted $C_6$~$C_{20}$ aryl.

A non-aqueous solvent included in a secondary battery may be generally thermally decomposed, as a temperature of the battery rises, and may be burned while generating radicals having a high reactive activity, such as OH· and H· through a chain combustion reaction, as below. In addition, since the radical production reaction may be an exothermic reaction, a combustion reaction of the non-aqueous solvent may occur in chain, causing explosion and ignition of the battery.

However, when a flame-retardant polymer, as described above, is included, radicals may be released from the flame-retardant polymer, and the released radicals may capture highly active H· radicals or OH· radicals generated during combustion of a non-aqueous solvent, to stop combustion.

Specifically, when the flame-retardant polymer is a phosphorus-based polymer, P radicals may be released from phosphorus-based monomers constituting the phosphorus-based polymer during combustion of a non-aqueous solvent, and the released P radicals may capture H radicals or OH radicals generated during combustion of the non-aqueous solvent, to suppress or stop further combustion.

In the disclosure, the flame-retardant polymer may form a matrix in the polymer electrolyte layer, and the flame-retardant polymer may further include a structural unit derived from a network-type polymer structure-derived compound.

Since the flame-retardant polymer may further include a structural unit derived from the network-type polymer structure-derived compound, a non-flowable organic and inorganic composite polymer electrolyte may be more easily manufactured.

The network-type polymer structure-derived compound may be different from the monomer having at least one double bond, may be a compound having 2 or more reactive functional groups, specifically, may be a compound having 2 to 4 reactive functional groups, and more specifically, may be a compound having three reactive functional groups.

Specifically, the network-type polymer structure-derived compound may be, as an example, a compound having a structure shown in Formula 2 below.

[Formula 2]

In Formula 2, $R^4$ to $R^6$ may each independently be selected from the group consisting of hydrogen, an acrylate group, a methacrylate group, a cyanoacrylate group, a vinyl acrylate group, a vinyl group, an allyl group, and a vinyl ether group, and at least two of $R^4$ to $R^6$ may be selected from the group consisting of an acrylate group, a methacrylate group, a cyanoacrylate group, a vinyl acrylate group, a vinyl group, an allyl group, and a vinyl ether group. More specifically, $R^4$ to $R^6$ may be the same or different from each other, and two or more thereamong may be functional groups having a double bond between carbons. For example, $R^4$ to $R^6$ may all be functional groups having a double bond between carbons.

In Formula 2, $R^7$ may be hydrogen, or substituted or unsubstituted hydrocarbyl, and the hydrocarbyl may be selected from substituted or unsubstituted $C_1$~$C_{20}$ alkyl, substituted or unsubstituted $C_2$~$C_{20}$ alkenyl, and substituted or unsubstituted $C_6$~$C_{20}$ aryl, and specifically may be $C_1$~$C_{10}$ alkyl.

The flame-retardant polymer may include a structural unit derived from a network-type polymer structure-derived compound to form a polymer network with a structural unit derived from a monomer having at least one double bond (specifically, a compound represented by Formula 1), to suppress flow of the organic and inorganic composite polymer electrolyte more easily.

Although not limited thereto, when applying a monomer having at least one double bond containing a small number of the above-described polymerizable groups (specifically, a monomer containing one polymerizable group, more specifically a compound represented by Formula 1), the flame-retardant polymer may further include a structural unit derived from a network-type polymer structure-derived compound, to control fluidity of the organic and inorganic composite polymer electrolyte more effectively.

For example, a structural unit derived from a flame-retardant monomer having at least one double bond, as described above, (specifically, a flame-retardant monomer represented by Formula 1) may be used in an amount of 10% by weight or less, or 8% by weight or less, 6% by weight or less, 5% by weight or less, or 3% by weight or less, based on a total weight of the organic and inorganic composite polymer electrolyte, the flame-retardant polymer may further include a structural unit derived from a network-type polymer structure-derived compound to secure non-fluidity of the organic and inorganic composite polymer electrolyte.

The structural unit derived from the network-type polymer structure-derived compound may be included in an amount of 20% by weight or less, for example, 1 to 20% by weight, based on the total weight of the organic and inorganic composite polymer electrolyte. The structural units derived from the network-type polymer structure-derived compound may be included in the above-mentioned range to secure non-fluidity and ionic conductivity of the organic and inorganic composite polymer electrolyte at the same time.

The flame-retardant polymer may be included in an amount of 50% by weight or less, for example, 2.5 to 50% by weight, based on the total weight of the organic and inorganic composite polymer electrolyte. The flame-retardant polymer may be included in the above-mentioned range to form a polymer network at an appropriate level in the electrolyte, and thus the organic and inorganic composite polymer electrolyte may not be excessively hardened and may secure appropriate fluidity, and excellent ionic conductivity and high battery efficiency characteristics may be achieved.

The flame-retardant polymer may be included in an amount of, for example, 2.5% by weight or more, 3% by weight or more, 5% by weight or more, 7% by weight or more, 10% by weight or more, 15% by weight or more, or 20% by weight or more, or may be included in an amount of 50% by weight or less, 45% by weight or less, 40% by weight or less, 35% by weight or less, or 30% by weight or less, based on the total weight of the organic and inorganic composite polymer electrolyte.

The organic and inorganic composite polymer electrolyte of the disclosure may include a flame-retardant inorganic salt, as described above. The organic and inorganic composite polymer electrolyte may include the flame-retardant inorganic salt to capture H radicals or block oxygen, generated by combustion of the non-aqueous solvent, to extinguish flames.

For example, the flame-retardant inorganic salt may be a fluoride that may generate fluorine radicals through thermal decomposition to capture H radicals. Specifically, the fluoride may be thermally decomposed during combustion to generate F radicals, and the F radicals may serve to capture H radicals generated by combustion of the non-aqueous solvent, to suppress combustion. This may be expressed in a reaction equation as follows.

$$[F]\cdot + H\cdot \rightarrow [F]H$$

Such a fluoride may include, but is not limited to, a fluoride of an alkali metal, a fluoride of an alkaline earth metal, or a fluoride of metal, and, specifically, may include a fluoride of the alkali metal such as Li, Na, K, Rb, Cs, or Fr; a fluoride of the alkaline earth metal such as Be, Mg, Ca, Sr, Ba, or Ra; a fluoride of a transition metal of groups 3 to 12; or a fluoride of a group 13 metal. More specifically, such a fluoride may be a fluoride of an alkali metal, or a fluoride of lithium or sodium. For example, the fluoride may include LiF, NaF, KF, etc., and more specifically, may be LiF or NaF.

Additionally, the flame-retardant inorganic salt may be an inorganic salt that generates carbon dioxide through thermal decomposition. The carbon dioxide produced by thermal decomposition may extinguish a flame by blocking oxygen, and examples of such a flame-retardant inorganic salt may include a carbonate compound. The carbonate compound may be thermally decomposed in burning, as shown in the reaction equation below, to generate $CO_2$ gas.

$$MCO_3 \rightarrow MO + CO_2$$

The $CO_2$ gas produced thereby may provide an effect of extinguishing the flame by blocking oxygen near the flame.

The carbonate compound, like the fluoride, may include a carbonate compound of an alkali metal, a carbonate compound of an alkaline earth metal, a carbonate compound of a transition metal of Groups 3 to 12; a carbonate compound of a Group 13 metal, and, more specifically, may be carbonate of Li or Na. For example, the carbonate compound may be a compound of $CO_3$ and the alkali metal such as Li, Na, K, Rb, Cs, or Fr, specifically may include $Li_2CO_3$, $Na_2CO_3$, $K_2CO_3$, $CaCO_3$, etc., and, more specifically, may include $LicCO_3$ or $Na_2CO_3$.

Additionally, the flame-retardant inorganic salt may have a solubility in water of 1.5 g/100 ml or less. When the solubility in water of the flame-retardant inorganic salt exceeds 1.5 g/100 ml, it may be difficult to secure an effect of improving mechanical properties, as the inorganic salt is dissolved in the electrolyte and separated into anions/cations.

The organic and inorganic composite polymer electrolyte according to the disclosure may include the flame-retardant inorganic salt described above, not only to suppress combustion of a non-aqueous solvent, but also may contribute to suppressing growth of Li dendrites.

When a shear modulus of the inorganic material is 6 GPa or more, growth of Li dendrites may be effectively suppressed, as described above. In the disclosure, a flame-retardant inorganic salt having a shear modulus of 7 GPa or more may be used to suppress growth of Li dendrites while ensuring flame retardancy of the organic and inorganic composite polymer electrolyte.

For example, in the disclosure, a predetermined amount of a flame-retardant inorganic salt having a shear modulus of 7 GPa or more may be included in the organic and inorganic composite polymer electrolyte, to improve flame retardancy of the organic and inorganic composite polymer electrolyte while also improving mechanical properties to effectively suppress formation of a lithium dendrite.

Specifically, the organic and inorganic composite polymer electrolyte may include an inorganic salt having a shear modulus of 7 GPa or more and 150 GPa or less, and, more specifically, may include an inorganic salt having a shear modulus of 7 GPa or more and 60 GPa or less. The shear modulus can be obtained by the method according to ASTM E143.

The flame-retardant inorganic salt may be included in an amount of 10% by weight or less, based on the total weight of the organic and inorganic composite polymer electrolyte.

The flame-retardant inorganic salt is not limited thereto, but may have a particle size of 5 nm or more and 50 μm or less. The particle size of the flame-retardant inorganic salt may satisfy the above range. When the particle size is less than 5 nm, a volume of the inorganic salt may increase to increase viscosity of a polymer electrolyte solution before curing, and it may be difficult to ensure uniform dispersion. When the particle size exceeds 50 μm, the inorganic salt particles may settle down, and it thus be difficult to ensure uniform dispersion.

The particle shape of the flame-retardant inorganic salt is not particularly limited, and may have various shapes such as spherical, cylindrical, or tubular.

An organic and inorganic composite polymer electrolyte according to the disclosure may incorporate a flame-retardant inorganic salt into a flame-retardant polymer matrix, and the flame-retardant inorganic salt may have a concentration gradient in a thickness direction on a surface of the organic and inorganic composite polymer electrolyte. Specifically, an amount of the flame-retardant inorganic salt may decrease, as the surface of the organic and inorganic composite polymer electrolyte progresses in the thickness direction. More specifically, the flame-retardant inorganic salt may exist locally on the surface of the organic and inorganic composite polymer electrolyte. For example, the flame-retardant inorganic salt may be concentrated in a region within 10% of the total thickness of the organic and inorganic composite polymer electrolyte.

As described above, an organic and inorganic composite polymer electrolyte containing a flame-retardant polymer and a flame-retardant inorganic salt, provided in the disclosure, may include a flame-retardant inorganic salt providing a function of strengthening mechanical properties within a matrix of the flame-retardant polymer, and furthermore, an electrolyte solution containing a non-aqueous solvent and a lithium salt as an electrolyte salt may be impregnated thereinto.

The organic and inorganic composite polymer electrolyte may be manufactured by polymerizing the monomer in a composition formed by mixing the monomer containing at least one double bond, the network-type polymer structure-derived compound that may be added as needed, the flame-retardant inorganic salt, the non-aqueous solvent, and the electrolyte salt, to prepare an organic and inorganic composite polymer electrolyte in which a flame-retardant inorganic salt and a non-aqueous liquid electrolyte are dispersed in a flame-retardant polymer matrix.

An organic and inorganic composite polymer electrolyte may also be produced by first polymerizing a composition containing a monomer containing at least one double bond and, as necessary, a network-type polymer structure-derived compound to prepare a flame-retardant polymer matrix, and then impregnating an electrolyte solution including an electrolyte salt and a non-aqueous solvent into the flame-retardant polymer matrix, and gelling the same.

A polymerization initiator may be included, as needed, for polymerization. The polymerization initiator may be used without particular limitation as long as it is a polymerization initiator commonly used in production of a polymer electrolyte. For example, the polymerization initiator may include a peroxide-based polymerization initiator, and may include, for example, tert-butyl peroxyneodecanoate (TBND); tert-butyl peroxypivalate (TBPP), tert-butyl peroxy-2-ethylhexanoate (TBPO), tert-butyl peroxy-3,5,5-trimethylhexanoate (TBPIN), azobisisobutyronitrile (AIBN), or the like.

The composition may additionally also include a crosslinking agent. The crosslinking agent is not particularly limited as long as it is a crosslinking agent commonly used in production of polymer electrolytes, and may include, for example, bisphenol A ethoxylate diacrylate, trimethylolpropane ethoxylate triacrylate (TMPETA), trimethylolpropane triacrylate (TMPTA), trimethylolpropane trimethacrylate (TMPTMA), or di-trimethylolpropane tetraacrylate (DTMPTA).

A method of polymerizing the flame-retardant polymer is not particularly limited, and may be carried out through thermal polymerization. In this case, a polymerization time may be approximately 30 minutes or more and 24 hours or less, and a heat polymerization temperature may be 40 to 100° C.

The electrolyte salt is not particularly limited as long as it is used as an electrolyte salt in a typical lithium secondary battery, and may be applied to the disclosure. The electrolyte salt is not limited thereto, but may include, for example, a combination of (i) a cation selected from the group consisting of $Li^+$, $Na^+$, and $K^+$, and (ii) an anion selected from the group consisting of $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, and $C(CF_2SO_2)_3^-$, but is not limited thereto. Such electrolyte salts may be used individually or in combination.

The non-aqueous solvent may be used without particular limitation as long as it is used as an organic solvent for a normal non-aqueous electrolyte, and cyclic carbonates, linear carbonates, lactones, ethers, esters, sulfoxides, acetonitrile, lactams, ketones, or the like may be used.

Examples of the cyclic carbonates may include ethylene carbonate (EC), propylene carbonate (PC), butylene carbonate (BC), fluoroethylene carbonate (FEC), or the like, and examples of the linear carbonates may include diethyl carbonate (DEC), dimethyl carbonate (DMC), dipropyl carbonate (DPC), ethylmethyl carbonate (EMC), methyl propyl carbonate (MPC), or the like.

In addition, examples of the lactones may include gammabutyrolactone (GBL), and examples of the ethers may include dibutyl ether, tetrahydrofuran, 2-methyltetrahydrofuran, 1,4-dioxane, 1,2-dimethoxyethane, 1,2-diethoxyethane, or the like, and examples of the esters may include methyl formate, ethyl formate, propyl formate, methyl acetate, ethyl acetate, propyl acetate, methyl propionate, ethyl propionate, butyl propionate, methyl pivalate, or the like.

In addition, the sulfoxides may include dimethyl sulfoxide or the like, the lactams may include N-methyl-2-pyrrolidone (NMP) or the like, and the ketones may include polymethylvinyl ketone.

Additionally, halogen derivatives of the organic solvents may be used, and any one of these organic solvents may be used alone, or two or more types thereof may be used in combination.

An organic and inorganic composite polymer electrolyte according to the disclosure may include a flame-retardant inorganic salt in a flame-retardant polymer matrix, and may be impregnated with an electrolyte solution containing an electrolyte salt and a non-aqueous solvent, and a polymer electrolyte all-solid-state battery containing the organic and inorganic composite polymer electrolyte may be provided. Specifically, the all-solid-state battery may have a positive electrode, a negative electrode, and the organic and inorganic composite polymer electrolyte located between the positive electrode and the negative electrode.

In the disclosure, the positive electrode is not particularly limited as long as it is commonly used in secondary batteries, and, for example, may include a positive electrode current collector; and a positive electrode mixture layer formed on at least one surface of the positive electrode current collector.

Components of the positive electrode current collector is not particularly limited, and a plate or foil formed of indium (In), copper (Cu), magnesium (Mg), stainless steel, titanium (Ti), iron (Fe), cobalt (Co), nickel (Ni), zinc (Zn), aluminum (Al), germanium (Ge), lithium (Li), or an alloy thereof may be used.

A positive electrode active material included in the positive electrode mixture layer is not particularly limited. Illustratively, the positive electrode mixture layer may include a lithium-transition metal oxide as the positive electrode active material, and may include, for example, lithium such as a lithium cobalt oxide ($LiCoO_2$), a lithium manganese oxide ($LiMn_2O_4$), a lithium nickel oxide ($LiNiO_2$), or the like, or a lithium-transition metal composite polymer oxide in which some of the transition metals are substituted with other transition metals. Specifically, the positive electrode active material may be an NCM-based positive electrode active material represented by the following Formula 3; or an Li-rich layered oxide (LLO) (an over-lithiated oxide (OLO) or an over-lithiated layered oxide (LLO))-based positive electrode active material represented by the following Formula 4.

$$Li_aNi_bM_{1-b}O_2 \qquad \text{[Formula 3]}$$

In Formula 3, 0.9≤a≤1.2, b≥0.5, M is at least one of Na, Mg, Ca, Y, Ti, Zr, Hf, V, Nb, Ta, Cr, Mo, W, Mn, Co, Fe, Cu, Ag, Zn, B, Al, Ga, C, Si, Sn, Ba, and Zr.

Specifically, in Formula 3, 0.95≤a≤1.08, and b is 0.6 or more, 0.8 or more, more than 0.8, 0.9 or more, or 0.98 or more.

Specifically, in Formula 3, M includes Co, Mn, or Al. More specifically, M includes Co and Mn, and optionally, further include Al.

$$Li_{1+x}M_{1-x}O_2 \qquad \text{[Formula 4]}$$

In Formula 4, 0≤x≤0.4, M is at least one of Na, Mg, Ca, Y, Ti, Zr, Hf, V, Nb, Ta, Cr, Mo, W, Ni, Mn, Co, Fe, Cu, Ag, Zn, B, Al, Ga, C, Si, Sn, Ba, and Zr.

Specifically, in Formula 4, M includes Ni, Co, Mn, or Al, and more specifically, may include Ni, Co, and Mn, and optionally, further include Al.

Additionally, the positive electrode active material may be a lithium iron phosphate (LFP)-based positive electrode active material represented by Formula $LiFePO_4$.

Additionally, the lithium-transition metal oxide may have a secondary particle form formed by assembling or agglomerating a plurality of primary particles to form substantially one particle, or may have a single particle form. The single particle form may mean, for example, excluding secondary particles in which a plurality of primary particles (e.g., more than 10) are assembled or aggregated to form substantially one particle. The single particle form may not exclude that 2 to 10 single particles are attached or closely adhered to each other to have a monolithic form. In some non-limiting embodiments, the positive electrode active material may include a secondary particle form and a single particle form.

The positive electrode mixture layer may further include a binder. The binder may include, for example, one or two or more of polyvinylidene fluoride, a styrene butadiene rubber (SBR), polytetrafluoroethylene, a vinylidene fluoride/hexafluoropropylene copolymer, and polyacrylonitrile, polymethyl methacrylate, or the like.

The positive electrode mixture layer may further include a conductive material. The conductive material may include, for example, one or two or more of graphite such as natural graphite, artificial graphite, or the like; a carbon-based material such as a carbon black, an acetylene black, a Ketjen black, a channel black, a furnace black, a lamp black, a summer black, a carbon fiber, a carbon nanotube (CNT), or the like; a metal powder or a metal fiber such as copper, nickel, aluminum, silver, or the like; an electric conductive whisker such as a zinc oxide, potassium titanate, or the like; an electric conductive metal oxide such as a titanium oxide or the like; or a conductive polymer such as a polyphenylene derivative or the like; or the like.

The negative electrode is not particularly limited as long as it is commonly used in secondary batteries, and, for example, may include a negative electrode current collector; and a negative electrode mixture layer formed on at least one side of the negative electrode current collector.

Components of the negative electrode current collector is not particularly limited, and a plate or foil formed of indium (In), copper (Cu), magnesium (Mg), stainless steel, titanium (Ti), iron (Fe), cobalt (Co), nickel (Ni), zinc (Zn), aluminum (Al), germanium (Ge), lithium (Li), or an alloy thereof may be used.

The negative electrode mixture layer may include a carbon-based active material such as artificial graphite or natural graphite, a silicon-based active material such as a silicon or silicon oxide ($SiO_x$; 0<x<2), Si—C composite, or the like, or a metal such as lithium metal or the like, as a negative electrode active material.

The negative electrode mixture layer may further include a binder. The binder may include, for example, one or two or more of a styrene butadiene rubber (SBR), polytetrafluoroethylene, polyvinylidene fluoride, polyethylene, a vinylidene fluoride/hexafluoropropylene copolymer, polyacrylonitrile, polymethyl methacrylate, or the like.

The negative electrode mixture layer may further include a conductive material. The conductive material may include, for example, one or two or more of graphite such as natural graphite, artificial graphite, or the like; a carbon-based material such as a carbon black, an acetylene black, a Ketjen black, a channel black, a furnace black, a lamp black, a summer black, a carbon fiber, a carbon nanotube (CNT), or the like; a metal powder or a metal fiber such as copper, nickel, aluminum, silver, or the like; an electric conductive whisker such as a zinc oxide, potassium titanate, or the like; an electric conductive metal oxide such as a titanium oxide or the like; or a conductive polymer such as a polyphenylene derivative or the like; or the like.

In the disclosure, in an all-solid-state battery containing the organic and inorganic composite polymer electrolyte, the organic and inorganic composite polymer electrolyte may have a concentration gradient of a flame-retardant inorganic salt, and in particular, a larger amount of the flame-retardant inorganic salt may be present on a surface contacting the negative electrode.

The flame-retardant inorganic salt may have a concentration gradient in which a concentration decreases from a surface toward a central portion with respect to a thickness of the organic and inorganic composite polymer electrolyte. For example, an amount of flame-retardant inorganic salt may be higher on a surface of the electrolyte, and when viewed in a thickness direction of the organic and inorganic composite polymer electrolyte, more may be present in a surface portion, as compared to in a central portion.

Generally, a solid electrolyte interface (SEI) layer may be formed on a surface of the negative electrode by reaction with the electrolyte. The SEI layer formed on the surface of the negative electrode will be considered to be derived from the electrolyte of the disclosure, and can be seen thus to constitute a portion of the electrolyte.

EXAMPLES

Hereinafter, the disclosure will be described in more detail through examples. The following examples may be intended to illustrate the disclosure by specific examples, and may not be intended to limit the disclosure thereby.

Inventive Example 1

—Organic and Inorganic Composite Polymer Electrolyte Composition—

As shown in Table 1 below, an organic and inorganic composite polymer electrolyte composition including a phosphorus-based polymer compound represented by Formula 1-1, a compound represented by Formula 2-1 (TM-PETA, a number average molecular weight of 428 g/mol), an electrolyte solution, and spherical LiF with a shear modulus of 55.1 GPa according to ASTM E143, in amounts shown in Table 1, was prepared. In Table 1, each amount is expressed as weight percent (wt %) based on a total weight of the organic and inorganic composite polymer electrolyte composition.

[Formula 1-1]

[Formula 2-1]

In Formula 2-1, n is 1.

The electrolyte solution was prepared by including 1M $LiPF_6$ as an electrolyte salt in a mixed solvent of ethyl carbonate (EC) and ethylmethyl carbonate (EMC) in a volume ratio of 3:7, and adding fluoroethylene carbonate (FEC) therein in an amount of 10%, based on a total weight of the electrolyte solution.

—Organic and Inorganic Composite Polymer Electrolyte—

The organic and inorganic composite polymer electrolyte composition prepared above was heat-cured at 70° C. for 1 hour to prepare an organic and inorganic composite polymer electrolyte.

Figure 1A:
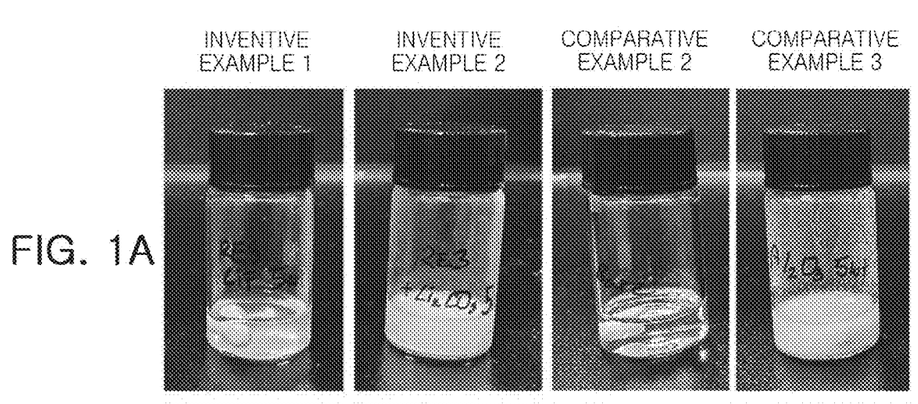
FIG. 1A is photographs taken to show transparent containers containing organic and inorganic composite polymer electrolytes disposed in a normal position.
Figure 1B:
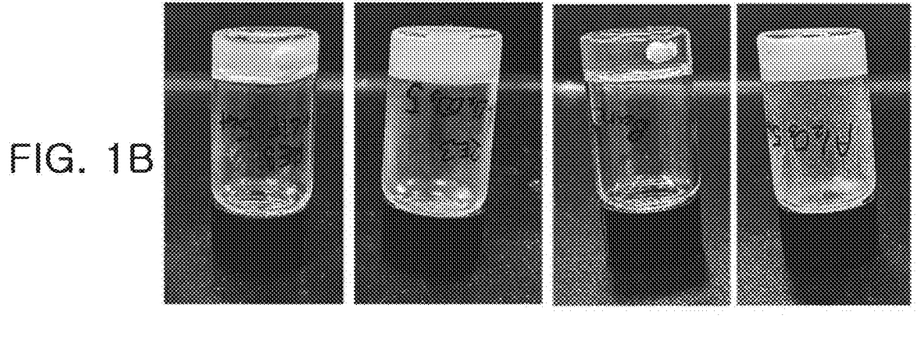
FIG. 1B is photographs taken to show the transparent containers turned over in a vertical direction.

To observe fluidity of the organic and inorganic composite polymer electrolyte, a transparent container containing the organic and inorganic composite polymer electrolyte was placed normally, then the transparent container was turned over to observe whether the electrolyte flows, and each photograph was taken as shown in FIG. 1A and FIG. 1B. In this case, FIG. 1A is photographs taken to show containers disposed in a normal position, and FIG. 1B is photographs taken to show the containers turned over in a vertical direction.

To evaluate flame retardancy of the organic and inorganic composite polymer electrolyte, the prepared organic and inorganic composite polymer electrolyte was ignited using a torch for 1 second. Next, time from the ignition to extinguishment thereof was measured, and results were calculated as time/electrolyte weight (sec/g) for a remaining organic and inorganic composite polymer electrolyte, and a self-extinguishment time (sec/g) was listed in Table 2.

Thereafter, a reduction rate in self-extinguishing time of Inventive Examples 1 and 2, when compared with self-extinguishing time of Comparative Example 1 as a standard, was shown in Table 2 as a reduction ratio relative to the standard.

—Coin Cell containing Organic and Inorganic Composite Polymer Electrolyte—

An Li electrode having a 100 μm thickness was cut to have a circle with a diameter of 1.6 cm, and a polyethylene separator having a 20 μm thickness was cut to have a circle with a diameter of 1.8 cm.

20 μL of the prepared organic and inorganic composite polymer electrolyte composition was added to each surface of the separator (total 40 μL), and then stacked in a structure of Li/electrolyte solution+polyethylene separator/Li to prepare a lithium symmetric coin cell.

In addition, the lithium symmetric coin cell was heat curing at 70° C. for 1 hour to manufacture an all-solid-state battery having a lithium symmetric coin cell structure.

For the all-solid-state battery manufactured above, the cell was operated under conditions of 1.5 mA/cm$^2$ and 2 hours, to analyze electrodeposition and stripping behaviors of lithium over time, for an all-solid-state battery having a lithium symmetrical structure.

Figure 2:
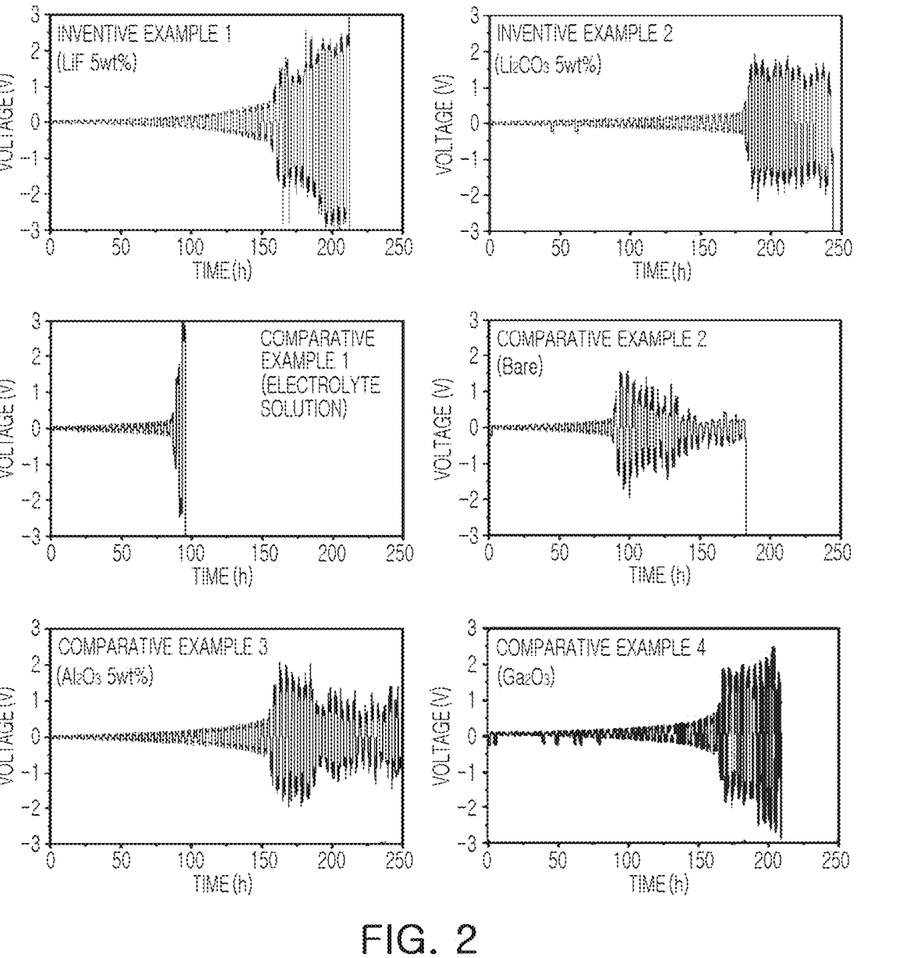
FIG. 2 illustrates graphs showing changes in voltage according to electrodeposition or stripping behavior of lithium over time, when lithium symmetric coin cells applied with electrolytes of Inventive Examples 1 and 2 and Comparative Examples 1 to 4, respectively, were driven under conditions of 1.5 mA/cm² and 2 hours.

A change in voltage over time of the coin cell due to the electrodeposition and stripping of lithium was observed, and results therefrom were shown in a graph of FIG. 2.

Inventive Example 2

An organic and inorganic composite polymer electrolyte was prepared in the same manner as in Inventive Example 1, except that spherical $Li_2CO_3$ with a shear modulus of 8.0 GPa was used, instead of the LiF with a shear modulus of 55.1 GPa used in Inventive Example 1.

Evaluation of the prepared organic and inorganic composite polymer electrolyte was performed in the same manner as in Inventive Example 1, a picture for fluidity was shown in FIG. 1A and FIG. 1B, and a self-extinguishing time and a reduction ratio, relative to the standard, were shown in Table 2.

Furthermore, an all-solid-state battery having a lithium symmetric coin cell structure was manufactured in the same manner as in Inventive Example 1, and electrodeposition and stripping behaviors of lithium over time were analyzed. Results therefrom were shown in FIG. 2.

Inventive Example 3

An organic and inorganic composite polymer electrolyte was prepared in the same manner as in Inventive Example 1, except that a fluorinated polymer compound represented by Formula 1-2 was used, instead of the compound represented by Formula 1-1 in Inventive Example 1.

[Formula 1-2]

Evaluation of the prepared organic and inorganic composite polymer electrolyte was performed in the same manner as in Inventive Example 1, and a self-extinguishing time and a reduction ratio, relative to the standard were analyzed. Results therefrom were shown in Table 2.

Inventive Example 4

An organic and inorganic composite polymer electrolyte was prepared in the same manner as in Inventive Example 3, except that spherical $Li_2CO_3$ with a shear modulus of 8.0 GPa was used, instead of the LiF with a shear modulus of 55.1 GPa used in Inventive Example 3.

Evaluation of the prepared polymer electrolyte was performed in the same manner as in Inventive Example 1, and a self-extinguishing time and a reduction ratio, relative to the standard, were shown in Table 2.

Comparative Example 1

A lithium symmetric coin cell having a Li/electrolyte+PE separator/Li structure was manufactured using an Li electrode and a PE separator in the same method as in Inventive Example 1.

In this case, the lithium symmetric coin cell was manufactured in the same manner as Inventive Example 1, except that the electrolyte did not contain the compounds represented by Formulas 1-1 and 2-1, had a composition of 1M $LiPF_6$-EC/EMC (3/7, v/v)+10 wt % FEC, and a thermal curing process, after manufacturing the coin cell, was not performed.

For the electrolyte battery prepared above, the cell was operated under conditions of 1.5 $mA/cm^2$ and 2 hours, to analyze electrodeposition and stripping behaviors of lithium over time, and analysis results therefrom were shown in FIG. 2.

Comparative Example 2

An organic and inorganic composite polymer electrolyte was prepared in the same manner as in Inventive Example 1, except that the LiF used in Inventive Example 1 was not added.

Evaluation of the prepared organic and inorganic composite polymer electrolyte was performed in the same manner as in Inventive Example 1, a picture for fluidity was shown in FIG. 1A and FIG. 1B, and a self-extinguishing time and a reduction ratio, relative to the standard, were shown in Table 2.

Furthermore, an all-solid-state battery having a lithium symmetric coin cell structure was manufactured in the same manner as in Inventive Example 1, electrodeposition and stripping behaviors of lithium over time were analyzed, and results therefrom were shown in FIG. 2.

Comparative Example 3

An organic and inorganic composite polymer electrolyte was prepared in the same manner as in Inventive Example 1, except that a spherical inorganic Al: 03 with a shear modulus of 152.0 GPa was used, instead of the LiF with a shear modulus of 55.1 GPa used in Inventive Example 1.

Evaluation of the prepared organic and inorganic composite polymer electrolyte was performed in the same manner as in Inventive Example 1, a picture for fluidity was shown in FIG. 1A and FIG. 1B, and a self-extinguishing time and a reduction ratio, relative to the standard, were shown in Table 2.

Furthermore, an all-solid-state battery having a lithium symmetric coin cell structure was manufactured in the same manner as in Inventive Example 1, electrodeposition and stripping behaviors of lithium over time were analyzed, and results therefrom were shown in FIG. 2.

Comparative Example 4

An organic and inorganic composite polymer electrolyte was prepared in the same manner as in Inventive Example 1, except that a spherical inorganic Ga: 03 with a shear modulus of 76.0 Gpa was used, instead of the LiF with a shear modulus of 55.1 GPa used in Inventive Example 1.

Evaluation of the prepared organic and inorganic composite polymer electrolyte was performed in the same manner as in Inventive Example 1, and a self-extinguishing time and a reduction ratio, relative to the standard, were shown in Table 2.

Furthermore, an all-solid-state battery having a lithium symmetric coin cell structure was manufactured in the same manner as in Inventive Example 1, electrodeposition and stripping behaviors of lithium over time were analyzed, and results therefrom were shown in FIG. 2.

TABLE 1

| | Electrolyte (wt %) | Flame-Retardant Polymer/Amount (wt %) | Formula 2-1 (wt %) | Inorganic Salt Shear Modulus (GPa) | Amount (wt %) |
|---|---|---|---|---|---|
| Inventive Example 1 | 90 | Formula 1-1/2.5 | 2.5 | 55.1 | 5 |
| Inventive | 90 | Formula 1-1/2.5 | 2.5 | 8.0 | 5 |

TABLE 1-continued

| | Electrolyte (wt %) | Flame-Retardant Polymer/Amount (wt %) | Formula 2-1 (wt %) | Inorganic Salt Shear Modulus (GPa) | Amount (wt %) |
|---|---|---|---|---|---|
| Inventive Example 2 | | | | | |
| Inventive Example 3 | 90 | Formula 1-2/2.5 | 2.5 | 55.1 | 5 |
| Inventive Example 4 | 90 | Formula 1-2/2.5 | 2.5 | 8.0 | 5 |
| Comparative Example 1 | 100 | 0 | 0 | — | 0 |
| Comparative Example 2 | 95 | Formula 1-1/2.5 | 2.5 | — | 0 |
| Comparative Example 3 | 90 | Formula 1-1/2.5 | 2.5 | 152.0 | 5 |
| Comparative Example 4 | 90 | Formula 1-1/2.5 | 2.5 | 76.0 | 5 |

TABLE 2

| | Self-Extinguishment Time (sec/g) | Reduction Rate relative to Standard |
|---|---|---|
| Inventive Example 1 | 48.5 | −42.9% |
| Inventive Example 2 | 49.7 | −41.5% |
| Inventive Example 3 | 45.1 | −46.9% |
| Inventive Example 4 | 46.3 | −45.5% |
| Comparative Example 1 | 85.0 | 0.0% |
| Comparative Example 2 | 73.4 | −13.6% |
| Comparative Example 3 | 69.6 | −18.0% |
| Comparative Example 4 | 70.5 | −17.1% |

—Electrolyte Fluidity Evaluation—

As can be seen from FIG. 1A and FIG. 1B, it can be confirmed that the organic and inorganic composite polymer electrolytes, prepared in Inventive Examples 1 and 2 and Comparative Examples 2 and 3, did not flow even though they contain an electrolyte solution, but all electrolytes included in each battery were manufactured in a gel or solid state.

—Extinguishment Evaluation—

Comparative Example 2 was an electrolyte manufactured by applying only a flame-retardant polymer, and it was found that a self-extinguishing time was shortened by about 18%, compared to the electrolyte solution in Comparative Example 1.

Comparative Examples 3 and 4 were organic and inorganic composite polymer electrolytes additionally containing inorganic particles of alumina and gallium oxide, respectively, compared to Comparative Example 2, and showed that an effect of shortening a self-extinguishing time was not significant, despite additionally containing the inorganic materials in a non-significant amount. From these results, it was found that alumina ($Al_2O_3$) and gallium oxide had no effect of improving flame retardancy. Although not presented as a comparative example, it can be seen that even though silica was included, it will not provide a flame-retardant improvement effect, in a similar manner to alumina.

The organic and inorganic composite polymer electrolytes of Inventive Examples 1 and 2 included the flame-retardant polymer of Formula 1-1, had significantly shortened self-extinguishing times of 48.5 sec/g and 49.7 sec/g, respectively, and provided excellent results of reducing a self-extinguishing time by 40% or more relative to the standard.

In addition, the organic and inorganic composite polymer electrolytes of Inventive Examples 3 and 4 included the flame-retardant polymer of Formula 1-2, had self-extinguishing times of 45.1 sec/g and 45.3 sec/g, respectively, relative to the standard, and provided excellent results of reducing a self-extinguishing time by 40% or more relative to the standard.

It can be seen that although not intended to be bound by a specific theory, an F radical generated when LiF, which is an inorganic salt included in the organic and inorganic composite polymer electrolyte, is decomposed by heat captures a H radical or an OH radical generated by thermal decomposition of a non-aqueous solvent, and $CO_2$ produced by decomposition of $Li_2CO_3$ by heat blocks a reaction with oxygen provides a fire extinguishing effect.

From this, it was found that excellent flame retardancy may be provided when an inorganic salt capable of releasing an F radical or CO: by thermal decomposition is included, together with a flame-retardant polymer.

—Lithium Electrodeposition/Stripping Evaluation—

When each electrolyte of Inventive Examples 1 and 2 and Comparative Examples 1 to 4 was applied, results of evaluating electrodeposition and stripping behaviors of lithium metal were shown in FIG. 2. As can be seen from FIG. 2, referring to an order increasing overpotential in an Li symmetric cell, an of overpotential increased even before reaching 100 hours in the cell of Comparative Example 1 to which a liquid electrolyte was applied, and in the battery of Comparative Example 2 to which a polymer electrolyte without inorganic particles was applied, an increase in voltage occurred at a similar time as Comparative Example 1, but a degree of overpotential was alleviated.

An overpotential increased similarly in the battery of Comparative Example 3 to which an organic and inorganic composite polymer electrolyte containing alumina as an inorganic particle was applied, and in the battery of Inventive Example 1 to which an organic and inorganic composite polymer electrolyte containing LiF as an inorganic particle was applied, and in the battery of Inventive Example 2 to which the organic and inorganic composite polymer electrolyte containing a $Li_2CO_3$ inorganic salt was applied, the latest increase in overpotential was shown.

An increase in overpotential, described above, was due to formation of lithium dendrites. From the above results, it was found that inorganic salts, for example, inorganic salts having a shear modulus of 8 to 55.1 GPa, such as LiF and $Li_2CO_3$ used in the examples were added to suppress Li dendrite growth, and lithium electrodeposition/stripping efficiency was further improved.

From these results, it can be seen that when adding the alkali metal fluoride or alkali metal carbonate compound, as proposed in the disclosure, combustion of the organic and inorganic composite polymer electrolyte may be suppressed and formation of lithium dendrites may be suppressed.

According to the disclosure, flame retardancy of a polymer electrolyte may be improved even though a non-aqueous electrolyte is included therein, and thereby ignition and thermal runaway may be suppressed or prevented even when a solid battery including the polymer electrolyte internally overheats.

In addition, an organic and inorganic composite polymer electrolyte of the disclosure may suppress growth of a lithium dendrite, thereby preventing short circuit in a battery, further improving safety of the battery, and improving lifespan of the battery.

An organic and inorganic composite polymer electrolyte of the disclosure may be widely applied in green technology fields such as electric vehicles, battery charging stations, solar power generation using batteries, wind power generation, or the like. In addition, the organic and inorganic composite polymer electrolyte of the disclosure may be used in eco-friendly electric vehicles, hybrid vehicles, or the like to prevent climate change by suppressing air pollution and greenhouse gas emissions.

Only specific examples of implementations of certain non-limiting embodiments may be described. Variations, improvements and enhancements of the disclosed embodiments and other non-limiting embodiments may be made based on the disclosure of this patent document.

What is claimed is:

1. An organic and inorganic composite polymer electrolyte comprising:
    a flame-retardant polymer matrix;
    flame-retardant inorganic salt particles within the flame-retardant polymer matrix, wherein the flame-retardant inorganic salt particles comprise a shear modulus of 7 to 60 GPa, and wherein the flame-retardant inorganic salt particles generate an F radical; and
    an electrolyte solution comprising a non-aqueous solvent and an electrolyte salt impregnated into the flame-retardant polymer matrix,
    wherein the flame-retardant inorganic salt particles do not dissolve in the electrolyte solution,
    wherein the flame-retardant polymer matrix comprises a fluorinated polymer containing at least one phosphonate group,
    wherein a phosphorus element in the phosphonate group of the fluorinated polymer is directly bonded to an aromatic ring.

2. The organic and inorganic composite polymer electrolyte of claim 1, wherein the flame-retardant polymer matrix further comprises at least one selected from the group consisting of a phosphorus-based polymer, a phosphazene-based polymer, and an ionic polymer.

3. The organic and inorganic composite polymer electrolyte of claim 2, wherein the phosphorus-based polymer comprises at least one selected from the group consisting of phosphate, phosphonate, and phosphinate.

4. The organic and inorganic composite polymer electrolyte of claim 2, wherein the phosphorus-based polymer comprises a structural unit derived from a compound represented by Formula 1:

[Formula 1]

wherein:
    $L^1$ to $L^3$ are each independently a direct bond or substituted or unsubstituted $C_1$~$C_{20}$ alkyl, and
    $R^1$ to $R^3$ are independent of each other, at least one thereof is a functional group having a double bond between carbons, and the others thereof are each independently a hydrogen or a substituted or unsubstituted hydrocarbyl group.

5. The organic and inorganic composite polymer electrolyte of claim 4, wherein the functional group having the double bond between carbons is selected from the group consisting of an acrylate group, a methacrylate group, a cyanoacrylate group, a vinyl acrylate group, a vinyl group, an allyl group, and a vinyl ether group.

6. The organic and inorganic composite polymer electrolyte of claim 4, wherein the hydrocarbyl group is selected from the group consisting of substituted or unsubstituted $C_1$~$C_{20}$ alkyl, substituted or unsubstituted $C_2$~$C_{20}$ alkenyl, and substituted or unsubstituted $C_6$~$C_{20}$ aryl.

7. The organic and inorganic composite polymer electrolyte of claim 2, wherein the phosphazene-based polymer comprises at least one selected from the group consisting of linear phosphazene and cyclic phosphazene.

8. The organic and inorganic composite polymer electrolyte of claim 1, wherein the flame-retardant polymer matrix further comprises a structural unit derived from a network-type polymer structure-derived compound having two or more reactive functional groups.

9. The organic and inorganic composite polymer electrolyte of claim 8, wherein the network-type polymer structure-derived compound comprises a compound represented by the following Formula 2:

[Formula 2]

$$R^6O\diagdown\phantom{X}\diagup R^7$$
$$R^5O\diagup\phantom{X}\diagdown OR^4$$

wherein:
    $R^4$ to $R^6$ are each independently selected from the group consisting of hydrogen, an acrylate group, a methacrylate group, a cyanoacrylate group, a vinyl acrylate group, a vinyl group, an allyl group, and a vinyl ether group,
    at least two of $R^4$ to $R^6$ are selected from the group consisting of an acrylate group, a methacrylate group, a cyanoacrylate group, a vinyl acrylate group, a vinyl group, an allyl group, and a vinyl ether group, and
    $R^7$ is selected from hydrogen, substituted or unsubstituted $C_1$~$C_{20}$ alkyl, substituted or unsubstituted $C_2$~$C_{20}$ alkenyl, and substituted or unsubstituted $C_6$~$C_{20}$ aryl.

10. The organic and inorganic composite polymer electrolyte of claim 1, wherein the flame-retardant polymer matrix is included in an amount of 50% by weight or less based on a total weight of the organic and inorganic composite polymer electrolyte.

11. The organic and inorganic composite polymer electrolyte of claim 1, wherein the flame-retardant inorganic salt particles comprise a solubility in water of 1.5 g/100 mL or less.

12. The organic and inorganic composite polymer electrolyte of claim 1, wherein the flame-retardant inorganic salt particles comprise a particle size of 5 nm to 50 μm.

13. The organic and inorganic composite polymer electrolyte of claim 1, wherein the flame-retardant inorganic salt particles are a fluoride of metal.

14. The organic and inorganic composite polymer electrolyte of claim 1, wherein the flame-retardant inorganic salt particles comprise a fluoride of Li or Na.

15. The organic and inorganic composite polymer electrolyte of claim 1, wherein the flame-retardant inorganic salt particles are included in amount of 10% by weight or less based on a total weight of the organic and inorganic composite polymer electrolyte.

16. The organic and inorganic composite polymer electrolyte of claim 1, wherein the electrolyte salt is a lithium salt.

17. An all-solid-state battery comprising:
a negative electrode,
a positive electrode, and
the organic and inorganic composite polymer electrolyte of claim 1 between the negative electrode and the positive electrode.

18. The all-solid-state battery of claim 17, wherein the organic and inorganic composite polymer electrolyte comprises a concentration gradient of the flame-retardant inorganic salt particles.

19. The all-solid-state battery of claim 17, wherein an amount of the flame-retardant inorganic salt particles in a surface portion is greater than an amount of the flame-retardant inorganic salt particles in a central portion, in a thickness direction of the organic and inorganic composite polymer electrolyte based on weight.

* * * * *